United States Patent [19]

Wucherpfennig et al.

[11] Patent Number: 4,560,565

[45] Date of Patent: Dec. 24, 1985

[54] METHOD OF STABILIZING MUST, STILL WINES AND SPARKLING WINES WITH RESPECT TO PRECIPITATION

[75] Inventors: Karl Wucherpfennig, Wiesbaden; Ernst W. Bott; Peter Schottler, both of Oelde, all of Fed. Rep. of Germany

[73] Assignee: Westfalia Separator AG, Oelde, Fed. Rep. of Germany

[21] Appl. No.: 554,158

[22] Filed: Nov. 22, 1983

[30] Foreign Application Priority Data

Nov. 30, 1982 [DE] Fed. Rep. of Germany ....... 3244221

[51] Int. Cl.⁴ .......................... C12H 1/02; C12G 1/00; C12G 1/02; C12G 1/06
[52] U.S. Cl. .................................. 426/330.4; 426/592; 426/490
[58] Field of Search ...................... 426/330.4, 592, 490, 426/495

[56] References Cited

U.S. PATENT DOCUMENTS

| | | | |
|---|---|---|---|
| 3,865,960 | 2/1975 | Wucherpfennig et al. | 426/239 |
| 4,092,220 | 5/1978 | Tsurumi et al. | 435/145 |
| 4,112,128 | 9/1978 | Fessler | 426/330.4 |
| 4,322,446 | 3/1982 | Heess et al. | 426/330.4 |

OTHER PUBLICATIONS

Amerine, M. A.; *Wine Production Technology in the United States* Am. Chem. Society, ©1981, pp. 47 & 48.
Amerine, M. A. et al.; *The Technology of Wine Making*, 3rd ed., AVI Publ. Co., Conn. ©1972, pp. 562-564.

*Primary Examiner*—Steven Weinstein
*Assistant Examiner*—Elizabeth C. Weimar
*Attorney, Agent, or Firm*—Sprung Horn Kramer & Woods

[57] ABSTRACT

A method of stabilizing must and still and sparkling wines with respect to crystalline precipitation. Seed crystals of potassium hydrogentartrate are added to the products during processing to accelerate crystal growth. Since any calcium ions in the wine affect the crystallization of potassium hydrogentartrate, dipotassium DL-tartrate is also added to precipitate the calcium ions. The wine is cooled in a cooler and the colloids filtered out in a filter before the seed crystals are added and is finally stored at a low temperature in a tank. The precipitated crystals are removed in a hydrocyclone and 80% of them added along with dipotassium DL-tartrate to fresh wine that is to be stabilized. The added crystals are finely milled in colloid mills if necessary. The wine from the hydrocyclone is highly clarified in a centrifugal separator to eliminate any crystals not removed in the hydrocyclone.

7 Claims, 1 Drawing Figure

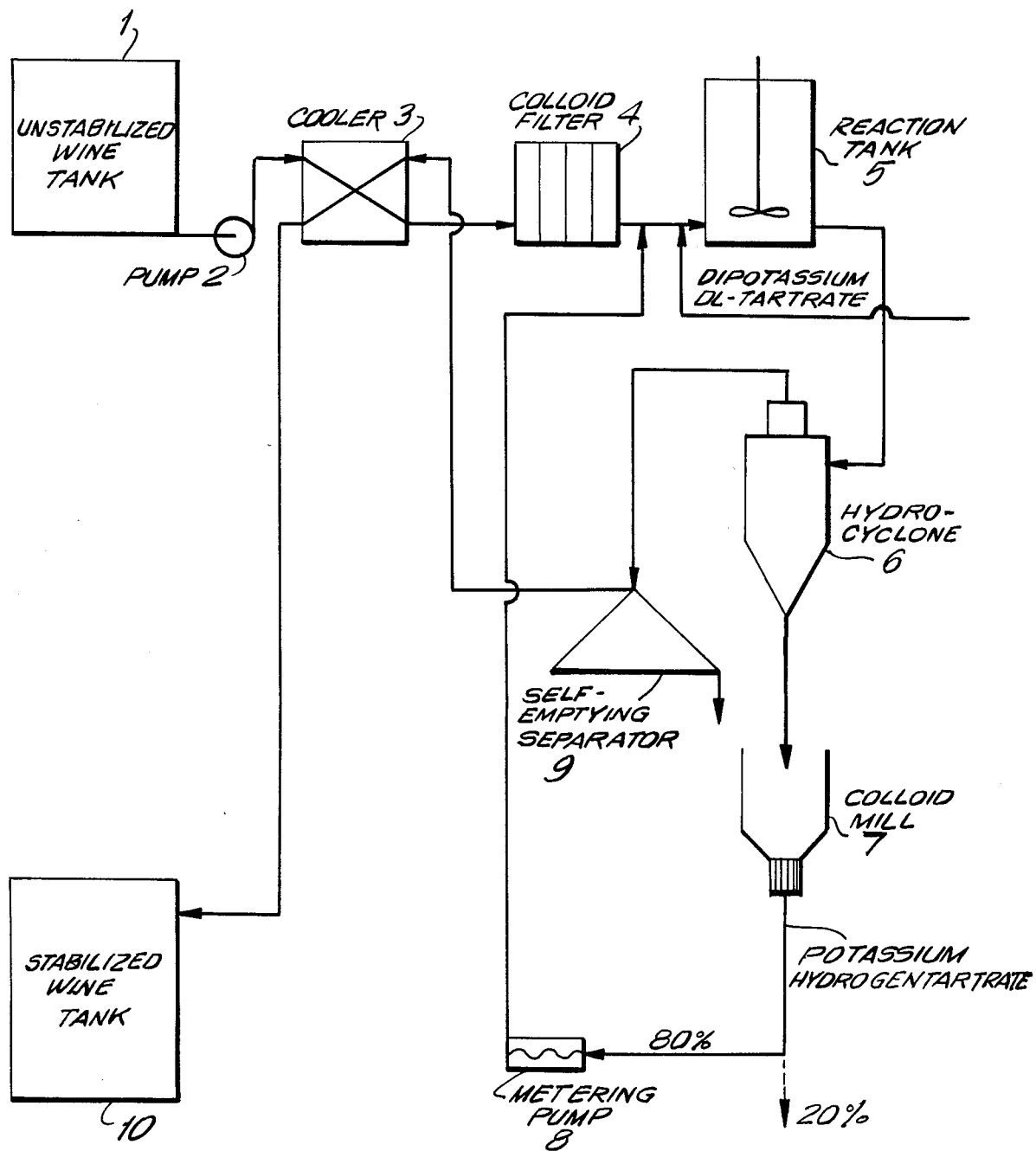

METHOD OF STABILIZING MUST, STILL WINES AND SPARKLING WINES WITH RESPECT TO PRECIPITATION

BACKGROUND OF THE INVENTION

The present invention relates to a method of stabilizing must and still and sparkling wines with respect to crystalline precipitation in which potassium hydrogentartrate is added to the products during processing to accelerate crystal growth.

Vintners have long known that potassium bitartrate, otherwise called tartar, precipitates in the form of crystals during or after the fermentation of must. The precipitation of tartar is primarily due to the production of alcohol during fermentation because tartar is considerably less soluble in alcohol than in water. The low temperatures that accompany the storage of wine in cellars and the biological decrease in acids also contribute to the precipitation of tartar. The latter implies increased pH, which ranges below 3, and leads to a decrease in the solubility of the tartar. The pH, on the other hand, decreases, if it is already below 3.5, as the tartar precipitates. Alterations in the pH can also cause tartar to precipitate when two wines that are in themselves stable are mixed together.

The precipitation of tartar can take several months. The crystallizing out of potassium bitartrate, which usually precipitates mixed to some extent with calcium tartrate, is especially undesirable if, as present-day consumers absolutely expect and desire, the wine is bottled "early." Consumers, generally ignorant of the processes involved, reject wine containing precipitates although they are deleterious to neither health nor quality.

As for sparkling wines, in which the increase in alcoholic content resulting from the second fermentation can reinforce the tendency to renewed precipitation of any tartar still in solution, the undesired consequence is that the carbon dioxide may easily be liberated due to the precipitated crystals once the bottle has been opened, making the wine foam up out of the bottle.

The same problem of tartar precipitation occurs with grape juice, even though it normally contains so much tartaric acid and potassium that it takes the tartar a long time to precipitate.

We know that the precipitation of tartar depends on many factors, like alcohol content, temperature, pH, and the content of potassium and calcium and of tartaric and other organic acids.

The problem of tartar stabilization occurs, however, with grape juice as well. The manufacture of grape-juice concentrate in particular encounters problems because a lot of tartar can precipitate while the juice is being boiled down. It usually has the undesirable property of establishing itself stubbornly on the inside of the evaporator, from which it is extremely difficult to rinse off. Even cleaning the evaporator with acid or alkaline liquids will frequently not remove it entirely and the apparatus must be mechanically scrubbed. In the worst case, the output of an evaporator can be reduced by half within 10 minutes, whereas cleaning may take hours.

The deposit of tartar on the inside of the evaporator may deteriorate heat transfer, often reducing the evaporation of water in a very short time.

Experience has demonstrated that the more alcohol a wine contains and the lower its temperature the lower the solubility of the tartar. The solubility also depends on pH to the extent that it decreases with increasing pH. Roughly, softer wines have a higher tendency to precipitate tartar than more acidic wines.

A number of studies of the affects of temperature on the precipitation of tartar exist. In the last analysis, the contents of potassium and tartaric acid are what is decisive for the tartar to crystallize out. The relationships between tartar precipitation on the one hand and pH and the contents of potassium, tartaric acid on the other have been thoroughly studied. These relationships can be completely determined with model solutions that imitate the composition of wines. Solubility curves at various temperatures, pH's, and levels of tartaric acid and potassium ions have been plotted.

A wine with about 10 degrees of alcohol and a pH of 3.35 has been shown to be tartar-unstable at $-1°$ C. when it contains 2 g of tartaric acid and 1000 mg of potassium. Cooling to $-1°$ C. will stabilize it if the content of tartaric acid is decreased to approximately 1.0 g/l and that of potassium to less that 750 mg. Stabilization can also be attained by decreasing the content of potassium with ion exchangers. In the present example, the content of potassium must be decreased from 1000 to 290 mg or that of tartaric acid from 2 to 0.7 g/l to tartar-stabilize.

Curves of solution equilibria have been plotted on the basis of known scientific studies that indicate whether and when a wine is or is not stable. To predict stability with respect to tartar precipitation one must know the pH and tartaric-acid and potassium contents of the wine. Once these parameters have been determined and the wine shown to be unstable, it must be cooled. It frequently turns out as a wine is cooled, however, that no more tartar can be precipitated in spite of long cooling. This finding implies that other factors also affect the precipitation of tartar.

Various authors have already indicated that the type of wine is of significance for tartar stability. Others have proved, in studies intended to determine the effects of ion-exchanger treatment on tartar instability, that removing the colorants and other polyphenoles from wines by treating them with carbon and the proteins by treating them with bentonite leads to considerable improvement in tartar precipitation.

The crystallization of tartar is especially irregular in wines, like red wines, that are rich in tannins, leading to the formation of mica-like sheet crystals instead of the more common forms. Investigation of this phenomenon has revealed that phenolic bodies impede the precipitation of tartar and affect the shape of the crystals. Other studies have indicated not only that the tartar crystallizes into different shapes, but also that precipitation is decelerated in the presence of tannins and proteins. It would be expected theoretically that wines containing tannins and proteins would, given a long enough time, precipitate just as much tartar as would a wine poor in these substances. Actually, since crystallization comes to a premature halt in the presence of polymeric materials, wines that have a high level of them contain tartar in a supersaturated solution.

From the standpoint of chemistry, this finding can be explained by the fact that a wine is not a "chemically pure" but rather a "contaminated" solution. Every chemist knows that substances are extremely difficult to crystallize from contaminated solutions. This also explains why wines often do not precipitate tartar in accordance with the empirical curves of solubility, which were plotted from the behavior of pure solutions.

Other substances in wine can also affect the crystallization of tartar. There is extensive but contradictory literature on the effect of simple sugars and sucrose. Koch and Geiss and Usseglio-Tomasset, for example, were unable to discover any effect of sucrose in retarding or preventing the precipitation of tartar, whereas Kramer and Böhringer as well as Negre et al. ascribe a certain increase in its solubility or a slight inhibition of its crystallization to sugar content.

A series of studies also exist on if and how the organic acids in a wine affect tartar precipitation. According to Kramer and Böhringer and to Koch and Schiller, malic acid slightly retards crystallization. Ivanov also comes to the conclusion that citric acid has the same effect, but not acetic, lactic, or succinic acid. Koch and Geiss achieved the same results with citric acid while denying the inhibiting effect of malic acid. According to Usseglio-Tomasset, both malic and lactic acid play a part in decelerating the precipitation of tartar.

It is evident on the whole that tartar crystallizes out subject to theoretical laws only in model solutions. In these the rate depends on temperature, alcohol content, and pH. The precipitation of tartar in wine, however, depends as we have seen on other factors as well. Especially inhibiting are condensed polyphenoles.

When a tartar-stable wine is cooled, an equilibrium becomes established, in six or seven days, in which the tartar still in the supersaturated solution ceases to precipitate completely but is retained in solution by polymers and colloidal substances.

A number of methods to prevent tartar from precipitating are employed in applied enology. Cooling the wine is common. It is, however, also conceivable to lower its content of the ions responsible for tartar precipitation. This can be done by precipitating some of the tartaric acid with added calcium ions or by partly removing it with anion exchangers. It is also possible to reduce the potassium-ion level with an exchanger treatment. It is even possible to chemically stabilize wines against tartar precipitation. Adding dissolved polymeric or colloidal substances to a wine will completely eliminate or considerably retard the precipitation of tartar.

Comprehensive literature exists on the technical procedures of cooling. It suggests cooling wine to a temperature between +4° and 0° C. Various recommendations exist as to the length of time a wine should be cooled to stabilize it against tartar precipitation. Some authorities consider 48–72 hours sufficient, whereas others believe that 8 to 10 days is necessary.

The beverage is generally cooled almost down to its freezing point in an insulated tank and stored several days at this temperature, with repeated stirring if necessary. The original cooling can also be conducted continuously in a scraped-wall chiller. If the costs of erecting a cooling plant cause concern, the wine or grape juice can also be cooled with carbon-dioxide ice in what is called cold tartar fining. Still, cooling remains an expensive method.

It is frequently determined during cooling that a wine will cease precipitating tartar in spite of long treatment. Agitating the wine by recirculation or inoculating it with crystallized tartar has accordingly been recommended when cooling does not produce satisfactory precipitation. Still, in spite of such measures, the wine once bottled will always precipitate tartar, and is hence still not tartar-stable. The cause of this phenomenon is to be sought in the fact that, as mentioned, polymeric substances retain the tartar in solution, at least for a while. Cooling is accordingly an unreliable method of stabilizing wines or juices against tartar precipitation.

It is therefore understandable that scientists and technologists have sought other methods and processes of tartar stabilization. It has already been discovered that a wine's content of potassium ions and tartaric acid is decisive for tartar precipitation. If the level of at least one of these substances drops, the wine will be naturally stabilized against tartar precipitation.

The easiest way to remove tartaric acid is to add calcium compounds, say calcium carbonate, as in the deacidification process generally known in applied enology. Deacidification by way of $CaO$, $Ca(OH)_2$, or the calcium salts of organic acids is also known.

Treating a wine with calcium compounds incurs the risk that small amounts of the calcium ions will remain in the wine because calcium tartrate normally does not precipitate quantitatively in accordance with its solubility product within a few days. Experience has shown that the precipitation of the calcium tartrate is protracted over at least six weeks, although it can also take months. In other words, this fact implies that these wines tend to recloud as the result of calcium compounds over a long period of time. Although it is accordingly possible to employ these methods to prevent the precipitation of potassium bitartrate it is not reliable with respect to the precipitation of slightly soluble calcium compounds. This is another reason why the methods of tartar stabilization have not prevailed in practice.

Another possibility is provided by anion exchangers. They have been initially employed since 1949 in France, Italy, and the USA exactly like calcium carbonate for the overall deacidification of wines. Since, however, they preferentially exchange polybasic acids, it is phosphoric, sulfuric, and tartaric acid that are primarily removed from the wine. The conditions for removing tartaric acid, which are much more promising than those for malic acid, are therefore desirable.

The only promising practical methods for removing potassium more or less selectively from the wine is treatment with cation exchangers. A large number of scientific studies have been published on this type of wine treatment. Time has shown that powerfully acidic sulfonated polystyrene resin is most appropriate, whereas the less acidic carboxyl resins have a much weaker action, which may be attributed to their lower dissociation. When employed in the pure $H+$ form, their pH drops and the wine becomes naturally more acidic. If the pure $Na+$ form is employed, an increase in pH can occur below 3.5. There is also a risk that the wine will taste bad and have a purgative effect. A combination regeneration of the ion exchangers with acid and sodium salts has accordingly been proposed, so that it will subsequently be present partly in the $H+$ form and partly in the $Na+$ form and the two drawbacks will occur only to a limited extent.

The addition of antiprecipitants has also been recommended to stabilize wine. Especially effective are metatartaric acid—"a polymeric ester of tartaric acid—" and mixtures that include citric acid, gelatine, and potassium metabisulfate. Metatartaric acid is prepared by heating tartaric acid to 170° C. Chemically, metatartaric acid is not a defined compound because it has no definite melting point. It is assumed that an interior esterization or the esterization of two or more molecules occurs as it is produced. It is capable of inhibiting the formation of potassium-bitartrate for a certain period of time. Later publications agree essentially that about 10 g of metatartaric acid should be added to 1 hl of wine and that tartar precipitation will be inhibited for up to 9 months.

Other materials that can be added to wine to stabilize the tartar include alkali salts. Thus, the Italian product Anticremor DC includes sodium sulfate and sodium hexametaphosphate, and the addition of small amounts of lithium carbonate has been proposed.

Tartar stabilization is also possible with reverse osmosis. This produces precipitation by concentrating the constituents of the wine through the separation of alcohol and water. It also results in an enrichment in potassium and tartaric acid, so that the tartar becomes increasingly supersaturated in solution and precipitates rapidly because the conditions for crystallizing out are more propitious as the result of the higher concentration.

Another potential method of tartar stabilization is electrodialysis. In this process, electrolytes migrate through a semipermeable membrane under the effect of electric energy. Ion-selective membranes can be employed to remove potassium ions and tartaric-acid ions from grape juice.

Experience demonstrates that the largest amounts of tartar precipitate during and after fermentation, during which only a labile equilibrium becomes established, so that new wines usually retain tartar in supersaturated solution. As previously mentioned supersaturation occurs when the higher-molecular substances in the wine bring the growth of crystals to a standstill.

The process of crystallization begins with the formation of nuclei in which the ions or molecules pass from an unorganized into an organized phase. Foreign particles like particle of dust, irregularities in the wall of the vessel, and crystal nuclei of a foreign substance can also function as centers of crystallization.

We do not as yet completely understand the process by which crystallization nuclei form. It must be imagined that the ions or molecules dissolved in an aqueous solution that contains no crystals collide as the result of thermal motion. By the laws of statistics, these collisions will include those in which more than two molecules collide within a sufficiently short interval of time. Naturally, this will happen more frequently the more concentrated the solution is. Thus, what are called agglomeration points will occur in the solution as concentration increases. These represent the primordial cells of nuclear formation. If the probability of the occurrence of agglomeration points is very high, crystallization nuclei will form. If supersaturation is maintained, the nuclei will grow into larger crystals. The growth of the crystals depends on the electrostatic attraction of ions or molecules. The forces of the surfaces that lead to bonding are the free valences or residual valences at the corners and edges of the crystals. All the ions inside the crystal are surrounded on all sides by other ions. The interior valences are saturated. The ions at the corners and in the surfaces of the crystal behave differently. Although the valences toward the inside of the crystal are saturated of course, free valences extend figuratively outward. Now ions from the ambient liquid are especially powerfully attracted by these active centers and attached to the corners or edges. Now, if the ambient liquid contains colloidal particles, they may be adsorbed by the active centers and this may bring crystal growth to a standstill.

Electron-optical images have demonstrated that colloidal particles are preferentially attached to the corners and edges of the crystal. If crystal growth does not break off, the crystals will continue to grow as long as the solution is supersaturated, meaning that an equilibrium will become established between the crystal and the saturated solution. This equilibrium is often not attained in even days or weeks.

All crystallization processes, including the formation of tartar crystals, depend on the one hand on the rate of nuclear formation and on the other on the rate of crystal growth. The stabilization of tartar will accordingly involve either increasing the rate of nuclear formation, which can be accomplished for example through concentration by means of reverse osmosis or through ultrasound treatment, or increasing the rate of growth. This depends, now, on the amount of polymeric substances of colloids in the wine again. These materials can occupy the active centers of the growing crystals and hence retard or even completely prevent growth. Once crystal growth breaks off, care must be taken to ensure that active crystal centers will be freed again. This can be achieved by breaking up the crystals. Breaking them up will reintroduce the formation of edges and corners with—figuratively speaking—free valences or active centers.

A method of adding tartar crystals with active centers in the form of potassium hydrogentartrate is known from German OS No. 2 640 384. This reinstates crystal growth without the necessity of new crystal nuclei forming. The rate of growth depends on the number of active centers at the added citric acid fragments. The more finely ground tartar is added the more rapidly the crystals will grow and the more tartar will be removed from wines that still retain it in supersaturated solution.

Experience has demonstrated the practicality of treating a wine with 4 g/l of seed crystals (potassium hydrogentartrate) to attain tartar stability within a few hours. The seed crystals grow as a result of the attachment of excessively dissolved potassium and excessively dissolved tartaric acid present in the wine and thus reduce the content of tartar so that no more tartar precipitation is to be feared once the crystals have separated. This method of tartar stabilization has been introduced under the designation of the "contact process."

The rate at which the seed crystals grow in this process is, however, also inhibited by substances that also retard tartar precipitation. Thus, 100 mg/l of metatartaric acid can completely prohibit growth. But other polymeric substances also have the capability of reducing the growth rate.

This is why it is recommended to employ the contact process only after strict preliminary filtration of the wine to remove part of the inhibiting polymeric substances.

The crystallization of tartar is, however, retarded not only by polymeric substances but also by calcium ions. If 4 g/l of potassium hydrogentartrate are added to a wine to accelerate crystallization of the tartar in supersaturated solution, the contents of tartaric acid and potassium will not decrease in the presence of large amounts of calcium ions as they would at lower concentrations. Let us illustrate one example of crystallization with a table. Increasing amounts of calcium salts were added to a wine, which was then seeded with 4 g/l of tartar at a temperature of 6° C. The conductivity of the wine, which decreases with crystallization, was then measured. Table I shows the resulting figures.

TABLE I

Inhibition of tartar precipitation by calcium ions (mg/l) as determined from decrease in conductivity ($\lambda \cdot 10^2$, with $\lambda$ in $\mu S$) at various intervals subsequent to addition of 4 g/l of tartar crystals at 6° C.

Calcium content in mg/l

| min | 92.5 $\lambda \cdot 10^2$ | $\Delta\lambda$ | min | 157.5 $\lambda \cdot 10^2$ | $\Delta\lambda$ | min | 192.5 $\lambda \cdot 10^2$ | $\Delta\lambda$ |
|---|---|---|---|---|---|---|---|---|
| 0 | 15.5 | | 0 | 17.85 | | 0 | 18.8 | |
| 28 | 15.0 | 50 | 26 | 17.55 | 30 | 25 | 18.5 | 30 |
| 40 | 14.9 | 60 | 54 | 17.4 | 45 | 41 | 18.5 | 30 |
| 65 | 14.75 | 75 | 73 | 17.2 | 65 | 58 | 18.3 | 50 |
| 83 | 14.65 | 85 | 90 | 17.2 | 65 | 200 | 18.1 | 70 |
| 104 | 14.6 | 90 | | | | | | |
| 126 | 14.55 | 95 | | | | | | |
| 195 | 14.45 | 105 | | | | | | |
| 236 | 14.45 | 105 | | | | | | |
| 1000 | 14.2 | 130 | 600 | 17.2 | 65 | | | |

This table shows that the conductivity ($\lambda$) of a wine with a low calcium content decreases at an essentially higher rate (130 $\mu S$) than it does (65 and 70 $\mu S$) in samples with a higher content.

The pH, total acid content, and contents of tartaric acid, potassium, and calcium of the wine were also determined before and after the addition of potassium hydrogentartrate after 4 hours. Table II shows the figures.

TABLE II

Changes in pH, total acid content (g/l), and contents of tartaric acid (g/l), potassium (mg/l), and calcium (mg/l) of wines with different calcium contents before and after the addition of 4 g/l of tartar crystals at +6° C. after 4 hours.

Addition of 4 g/l of tartar

| | before | after | before | after | before | after |
|---|---|---|---|---|---|---|
| pH | 3.35 | 3.34 | 3.35 | 3.34 | 3.33 | 3.32 |
| Tot. acid, g/l | 8.2 | 7.5 | 8.2 | 7.7 | 7.8 | 7.8 |
| Tart. acid, g/l | 2.16 | 1.34 | 2.16 | 1.57 | 1.92 | 1.52 |
| Potassium, mg/l | 1225 | 1075 | 1225 | 1100 | 1225 | 1125 |
| Calcium, mg/l | 92.5 | 92.5 | 162.5 | 157.5 | 192.5 | 192.5 |

The table shows that the pH shifts slightly in all cases as the result of tartar precipitation. Total acid decreases as expected. It is, however, clear that the decrease is less in wines that have a higher calcium content than in those with the lowest content. The content of tartaric acid decreases similarly in the samples treated with calcium than in those with the lowest level. The drop in potassium content is analogous. It decreases most in the wines with the lowest concentration of calcium. The calcium content changes only slightly in all cases. These findings indicate on the whole that calcium ions inhibit tartar precipitation to a considerable extent. The results show that tartar can be crystallized effectively only if the calcium content can be decreased.

It is of course possible to reduce the content of calcium ions by adding D-tartaric acid or DL-tartaric acid. This will result in the formation of calcium uvate, the calcium salt of DL-tartaric acid (racemic acid). Calcium uvate is ten times less soluble than calcium L-tartrate and precipitates in a few days. Both methods, however, involve the drawback that the acid content of the wine increases, which is especially undesirable for wines from the northern regions.

SUMMARY OF THE INVENTION

The object of the present invention is to provide a method of decreasing the content of calcium ions in must and still and sparkling wines without increasing their acid content, while simultaneously decreasing both the consumption of necessary contact agents and the reaction time in comparison with known methods.

This object is attained in accordance with the invention by adding dipotassium DL-tartrate in addition to potassium hydrogentartrate to precipitate the calcium ions, which inhibit the crystallization of potassium hydrogentartrate, in the form of calcium uvate.

When the method in accordance with the invention is employed, it turns out, surprisingly that the addition of dipotassium DL-tartrate decreases not only the content of calcium but also that of tartar. The addition of dipotassium DL-tartrate leads to an instantaneous precipitation of both tartar and calcium uvate. Decreasing the calcium content eliminates its inhibiting effect on the precipitation of tartar, which begins to crystallize out instantaneously, considerably promoted by the increased concentration of potassium ions.

It now becomes possible to re-employ some of the tartar precipitated in this way in a mixture with calcium uvate as contact tartar. It has turned out to be practical, however, to add only 80% of the tartar crystals along with dipotassium DL-tartrate to the next wine to be stabilized in order to precipitate calcium ions out again and to throw away the remaining 20%, which is the percentage of newly forming crystals, of the precipitated tartar crystals. Optimum results can only be obtained when at least 0.25 g/l of dipotassium DL-tartrate is added to the wine. Depending on the calcium content of the wine, however, it may be necessary to increase the amount of dipotassium DL-tartrate to 1 g/l.

Hydrocyclones and self-emptying centrifugal separators are especially practical for removing the tartar crystals. Most of the crystals are removed in the cyclone and the ones too fine for the cyclone are eliminated as the wine is polished in the centrifugal separator. The advantage of cyclones and separators over filters is that they operate continuously and there is no need to stop down to remove the separated crystals and precoat a filter. Filters also become impermeable very rapidly when wine is drawn off before crystallization is complete and they get blocked as a result of the inhibiting action of calcium.

Other characteristics of the method in accordance with the invention and of advances and modifications will be evident from the subsidiary claims and from the following description.

BRIEF DESCRIPTION OF THE DRAWING

A preferred embodiment of the invention will now be described with reference to the single attached schematic drawing wherein the FIGURE is a schematic of a system for carrying out the method according to the present invention.

DETAILED DESCRIPTION OF A PREFERRED EMBODIMENT

Unstabilized wine is conveyed from a tank 1 by a pump 2 to a cooler 3, where it is cooled to a temperature that optimally promotes crystallization. The colloids that impede crystallization are then filtered out by a filter 4. Next, potassium hydrogentartrate and dipotassium DL-tartrate are added. Storage at a low temperature for two hours in a reaction tank 5 precipitates the crystals of tartar, which are removed by a hydrocyclone 6. 80% of the crystals removed by hydrocyclone 6 are, if desired, finely milled in a colloid mill 7 to increase their contact surface and added through metering pump 8 along with a solution of dipotassium DL-tartrate to fresh unstabilized wine that is to be treated. The stabilized and clarified wine derived from cyclone 6 is preferably polished with a self-emptying centrifugal separator 9, subjected to heat exchange in cooler 3, and stored in a tank 10 for stabilized wine.

Table III shows results of tests of the stabilization of wine in accordance with the invention.

TABLE III

Changes in the pH, conductivity ($\lambda$ in $\mu S$) and contents of total acid (g/l), tartaric acid (g/l), potassium (mg/l), and calcium (mg/l) of five different wines before and after the addition of 4 g/l of contact tartar and of various amounts of dipotassium DL-tartrate at a temperature of 6° C. and a contact time of about 2 hours.

| WINE NO. | PARAMETER | BEFORE ADDITION | AFTER ADDITION OF 4 g/l CONTACT TARTAR | | | |
|---|---|---|---|---|---|---|
| | | | Amount of dipotassium DL-tartrate added g/l | | | |
| | | | 0 | 0.4 | 0.6 | 0.8 |
| 1 | pH | 3.52 | 3.50 | 3.65 | 3.67 | 3.69 |
| | Conductivity | 2020 | 1950 | 2210 | 2270 | 2320 |
| | Total acid, g/l | 4.4 | 3.9 | 4.2 | 4.2 | 4.2 |
| | Tartaric acid, g/l | 2.0 | 1.5 | 1.9 | 1.9 | 1.9 |
| | Potassium, mg/l | 2000 | 1850 | 1980 | 2100 | 2190 |
| | Calcium, mg/l | 79 | 79 | 35 | 18 | 9 |
| 2 | pH | 3.43 | 3.39 | 3.61 | 3.63 | 3.64 |
| | Conductivity | 2670 | 2440 | 2900 | 2960 | 3032 |
| | Total acid, g/l | 8.0 | 7.6 | 7.8 | 7.7 | 7.8 |
| | Tartaric acid, g/l | 2.1 | 1.5 | 2.0 | 1.9 | 1.9 |
| | Potassium, mg/l | 1800 | 1710 | 2130 | 2130 | 2160 |
| | Calcium, mg/l | 92 | 90 | 35 | 24 | 9 |
| 3 | pH | 3.43 | 3.50 | 3.62 | 3.62 | 3.64 |
| | Conductivity | 2800 | 2680 | 2980 | 3200 | 3250 |
| | Total acid, g/l | 6.4 | 6.0 | 6.4 | 6.3 | 6.3 |
| | Tartaric acid, g/l | 1.9 | 1.5 | 1.8 | 1.8 | 1.7 |
| | Potassium, mg/l | 1390 | 1190 | 1590 | 1660 | 1840 |
| | Calcium, mg/l | 74 | 72 | 32 | 17 | 10 |
| 4 | pH | 3.25 | 3.22 | 3.27 | 3.29 | 3.30 |
| | Conductivity | 2860 | 2710 | 2920 | 3000 | 3060 |
| | Total acid, g/l | 10.3 | 9.8 | 10.3 | 10.3 | 10.3 |
| | Tartaric acid, g/l | 1.9 | 1.4 | 1.9 | 1.9 | 1.7 |
| | Potassium, ml | 1200 | 1080 | 1310 | 1490 | 1540 |
| | Calcium, mg/l | 156 | 150 | 87 | 71 | 59 |
| 5 | pH | 3.59 | 3.55 | 3.63 | 3.65 | 3.66 |
| | Conductivity | 2140 | 1980 | 2170 | 2210 | 2270 |
| | Total acid, g/l | 5.4 | 4.9 | 5.4 | 5.4 | 5.4 |
| | Tartaric acid, g/l | 1.3 | 1.0 | 1.3 | 1.2 | 1.2 |
| | Potassium, mg/l | 1310 | 1220 | 1450 | 1530 | 1600 |
| | Calcium, mg/l | 128 | 125 | 48 | 21 | 15 |

This table shows on the basis of five samples of wine that pH changes as expected subsequent to the addition of the contact tartar with or without the addition of dipotassium DL-tartrate. Contact tartar lowers it, whereas the additional dipotassium DL-tartrate raises it. Conductivity also drops when contact tartar alone is added and rises when dipotassium DL-tartrate is also added. The content of total acid decreases as the result of treatment with contact tartar, although the decrease is significantly less or almost absent when dipotassium DL-tartrate is also added. The same is true of the content of tartaric acid. The potassium content decreases when the wine is treated with contact tartar but increases with the amount of dipotassium DL-tartrate added. Whereas the level of calcium remains practically unchanged when contact tartar is added, it rises considerably when dipotassium DL-tartrate is also added.

It turns out, surprisingly, that wines treated with contact tartar and dipotassium DL-tartrate do not tend to resume precipitating crystals when cooled even when the alcohol content is increased, in spite of the higher level of potassium.

It will be appreciated that the instant specification and claims are set forth by way of illustration and not limitation, and that various modifications and changes may be made without departing from the spirit and scope of the present invention.

What is claimed is:

1. A method of stabilizing the liquid products must, still wines and sparkling wines with respect to crystalline precipitation comprising; adding seed crystals of potassium hydrogentartrate and 0.25 to 1.0 g/l of dipotassium DL-tartrate to said liquid products during processing of said liquid products to accelerate crystal growth.

2. The method as in claim 1 wherein 4 g/l of potassium hydrogentartrate are added to said liquid products.

3. The method as in claim 2, further comprising cooling said liquid products before adding the seed crystals.

4. The method as in claim 3 further comprising storing said liquid products at a low temperature for 2 hours after adding the seed crystals.

5. The method as in claim 1, further comprising separating most of the precipitated crystals with a hydrocyclone and adding same to a new batch of said liquid products that is to be stabilized.

6. The method as in claim 5, further comprising using 80% of the precipitated crystals for said subsequent stabilization.

7. The method as in claim 5, further comprising polishing said liquid product in a centrifugal separator to eliminate the crystals not separated by the hydrocyclone.

* * * * *